J. C. SCHMIDT.

DOOR CHECK AND CLOSER.

APPLICATION FILED APR. 19, 1919.

Reissued June 24, 1919.

14,674.

2 SHEETS—SHEET 1.

Witness:
Fred. C. Davison

Inventor
John C. Schmidt
By Chas. F. Murray
Attys

J. C. SCHMIDT.
DOOR CHECK AND CLOSER.
APPLICATION FILED APR. 19, 1919.
Reissued June 24, 1919.
14,674.
2 SHEETS—SHEET 2.
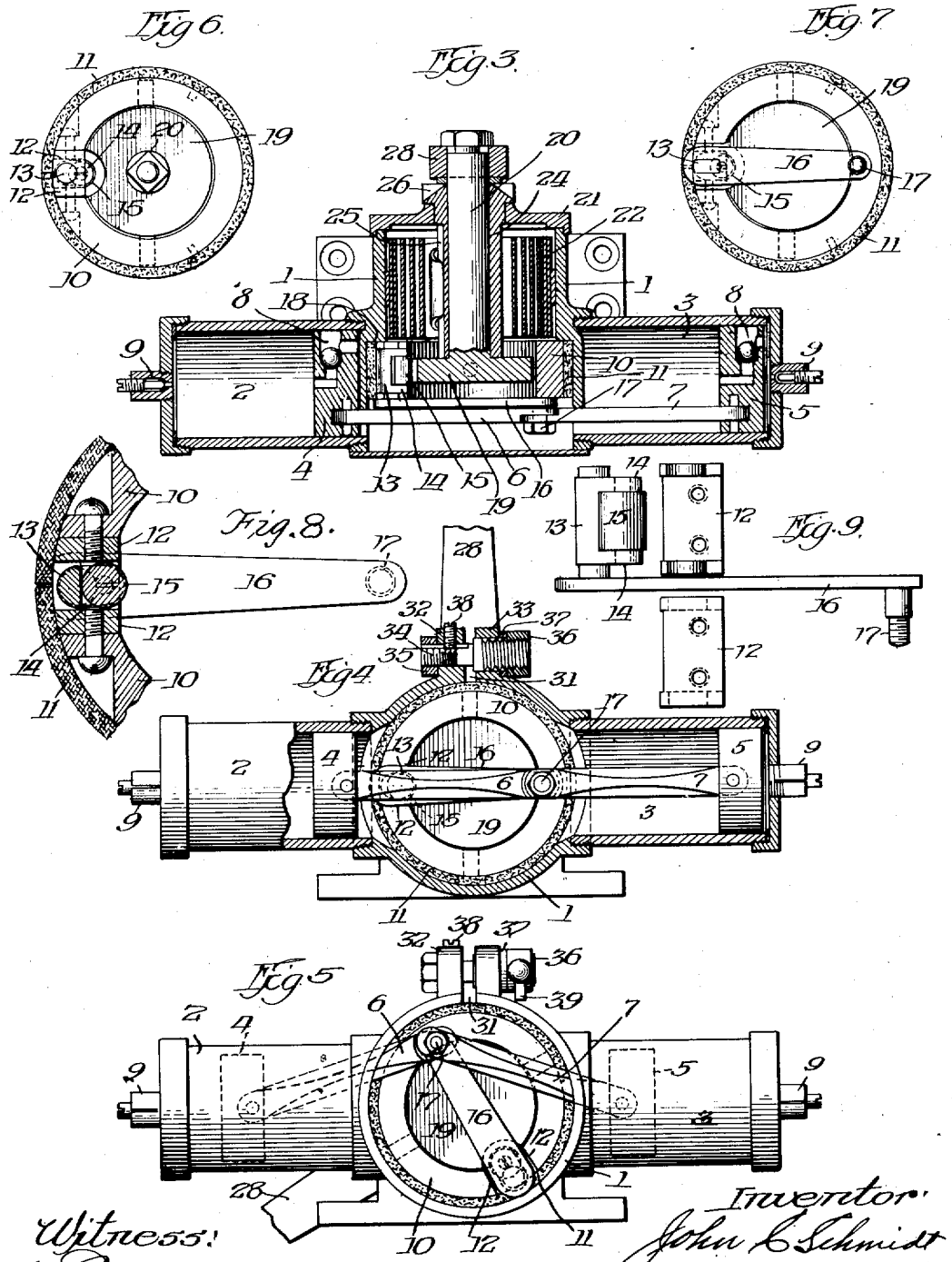
Witness:
Ed C Parsons
Inventor:
John C Schmidt
By Chas F Murray Atty.

UNITED STATES PATENT OFFICE.

JOHN C. SCHMIDT, OF CHICAGO, ILLINOIS.

DOOR CHECK AND CLOSER.

14,674. Specification of Reissued Letters Patent. Reissued June 24, 1919.

Original No. 1,266,864, dated May 21, 1918, Serial No. 190,231, filed September 7, 1917. Application for reissue filed April 19, 1919. Serial No. 291,364.

*To all whom it may concern:*

Be it known that I, JOHN C. SCHMIDT, a citizen of the United States, and a resident of Chicago, in the county of Cook and State of Illinois, have invented certain new and useful Improvements in Door Checks and Closers; and I do hereby declare the following to be a full, clear, and exact description of the invention, such as will enable others skilled in the art to which it appertains to make and use the same.

This invention relates to improvements in door checks and closers,—one object of the invention being to provide an efficient device of this character in which the use of liquid and the disadvantages incident thereto shall be avoided, and which shall depend for its accuracy of operation upon pneumatic and friction brake means.

A further object is to so construct a door check and closer that no resistance will be offered to the opening movement of the door and which will permit full force of the strength of the spring during the closing movement of the door.

A further object is to so construct a door check and closer employing pneumatic means that the vacuous condition produced will control the first half of the closing movement of the door, and so that the compression of air will control the other half.

A further object is to provide a door check and closer having pneumatic and friction brake means, in which compression of air and vacuous condition will control the application release of the friction brake devices.

A further object is to provide simple and efficient means for securing the parts to hold the door in any desired position.

With these and other objects in view, the invention consists in certain novel features of construction and combinations of parts as hereinafter set forth and pointed out in the claims.

In the accompanying drawings;

Fig. 3 is a longitudinal sectional view;

Fig. 4 is a bottom plan view partly in section showing the positions of the parts when the door is closed;

Fig. 5 is a similar view showing the positions of the parts when the door is open;

Figs. 6 and 7 are top and bottom plan views showing the brake device; and

Figs. 8 and 9 are detail views.

Figure 1:
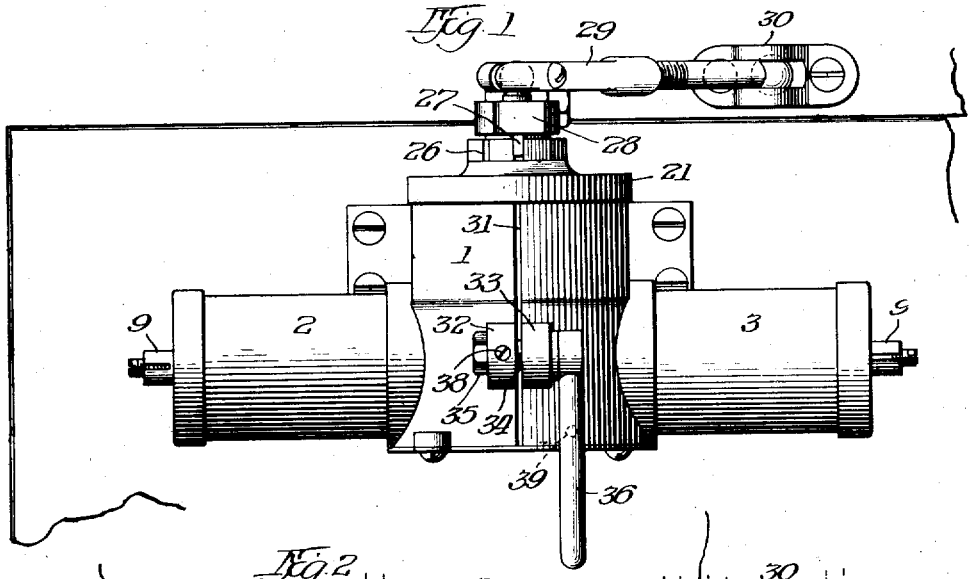
Figure 1 is a view in elevation of a door check and closer embodying my invention.
Figure 2:
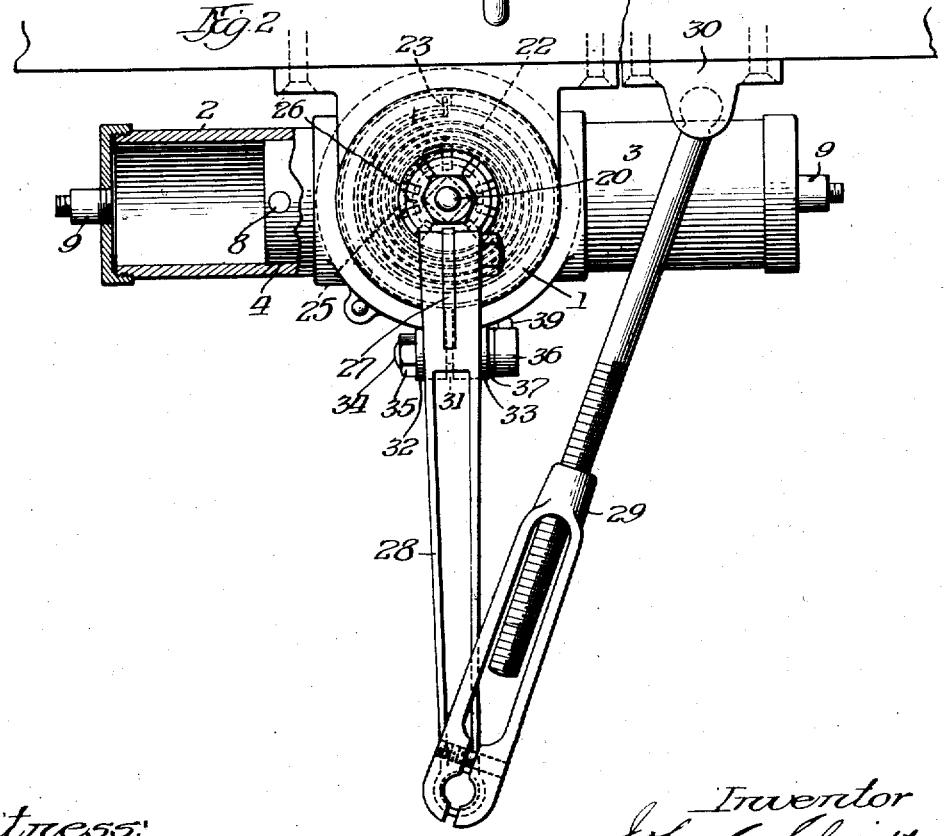
Fig. 2 is a top plan view of the same.

1 represents a casing provided with cylinders 2, 3, which are disposed diametrically opposite each other and communicate with the interior of said casing.

A friction element is located within the casing 1 so as to coöperate with the wall thereof and is connected with and controlled by the operation of pistons 4, 5 in the respective cylinders 2, 3,—said friction element being connected with said pistons by means of piston rods 6, 7. The pistons 4, 5 are provided with check valves 8 which operate to permit free movement of the same in one direction and retarded movement in the other direction, and valves 9 are provided at the outer ends of the cylinders 2, 3 for regulating the degree of compression in one of them and the degree of expansion or vacuum in the other.

In the present instance, the friction element above referred to comprises a split or divided brake ring 10 provided with a brake band 11 to engage the inner wall of the casing 1. Located within the space formed by dividing the brake ring are two recessed blocks 12, 12. These blocks are secured to the adjacent ends of the clutch ring and in effect, constitute parts of the same. A short shaft 13, mounted between the blocks 12, is provided with laterally projecting lugs 14, between which a roller 15 is mounted so as to engage one or the other of said blocks when the short shaft is turned and thus operate to expand the brake ring and cause frictional engagement of its band 11 with the inner wall of the casing 1. An arm or lever 16 is secured to one end of the short shaft 13 and projects across the brake ring, said lever being provided at its free end with a wrist pin 17 to which the two piston rods 6 and 7 are pivotally attached. It will be observed that with the construction above described, the short shaft 13 with the roller 15 mounted thereon constitute a crank on one end of the lever for expanding the clutch ring when said lever is moved.

The clutch ring is disposed under an annular shoulder 18 within the casing 1 and located within said brake ring and suitably pinned thereto so as to turn therewith, is a disk 19 from which a spindle 20, made rigid with the same, projects upwardly and passes through an opening in a cap 21 on said casing. A spring 22 is located within the casing 1 and the wall of the casing is made with a slot 23 to receive lugs at the outer end of said spring. A sleeve or spring winder 24 is mounted on the spindle 20 and is provided with a slot 25 to receive lugs on the inner end of the spring. The sleeve or winder 24 passes freely through the hole in the cap 21 and is provided at its upper end with a notched head 26 to receive a pawl 27 mounted on a lever 28 secured to the upper end of the spindle 20. An extensible arm 29 is loosely coupled at one end to the lever 28 and at its other end, this arm is loosely coupled to a suitable bracket 30 to be secured to the door frame.

It is apparent that when the door is opened, motion will be imparted through the lever 28 to the spindle 20 and the spring 22 to wind the latter and turn the brake ring 10. The casing 1 is split as at 31, and the adjacent edges are provided with perforated lugs 32—33 through which a bolt 34 passes. A portion of this bolt may be contracted somewhat in size and is threaded to receive a nut 35 which bears against the lug 32. The larger portion of the bolt is threaded and receives the internally threaded head of a lever 36,—a suitable ring or washer 37 being disposed between the lever head and the lug 33 on the casing. A portion of the bolt 34 is flattened to receive a set screw 38 mounted in the lug 32 to prevent movement of said bolt. The lever 36 may be provided with a foot 39 to rest upon the casing when said lever is in its normal position. By turning the lever 36 on the threaded bolt 34, the casing will be contracted somewhat and caused to tightly clamp the brake ring to prevent the same from turning. The mechanism may be locked in this manner to prevent movement of the door and thus the door may be held in any desired position. In order to compensate for wear between the band of the brake ring and the casing, the bolt 34 may be adjusted longitudinally.

In the operation of my improvements, no resistance is offered by the movements of the pistons in the cylinders to the opening of the door,—the valves in said pistons being so arranged as to permit free movement of said pistons during the opening movement of the door. The spring will be permitted to exert its full strength during the closing movement of the door and this closing movement is controlled by the automatic application and release of the brake as effected by the retardation and release of the pistons in the cylinders.

When the door is being opened, the spring 22 will be wound and its force will be applied to cause the closing of the door when the latter has been released. When the door is being closed by the application of the force of the spring 22, the clutch ring 10 will be turned and power will be applied to the pistons. At the beginning of the closing movement of the door the pistons cannot move freely because a vacuous condition will be created in one of the cylinders and air will be compressed in the other cylinder. Such retardation of the movement of the pistons as compared to the force of the spring 22 tending to move them, will cause the lever 16 to be turned slightly and its crank to expand the clutch ring, as previously explained. This application of the brake will cause a retardation of the closing movement of the door until the resistance to the movement of the pistons decreases sufficiently to permit the brake ring to contract and thus reduce frictional resistance to the closing of the door. Such release of the brake will be effected before the door has completed its closing movement so that the last portion of said movement will be comparatively free. During the first part of the closing movement of the door, the application of the brake will be effected by reason of the vacuous condition created in the cylinder 2. As the door approaches its closed position, the compression of air in the cylinder 3 will cause the final portion of the closing movement of the door to be retarded sufficiently to prevent slamming.

The reason for the employment of two oppositely acting cylinders and pistons is that the one in which compression takes place will hardly become effective until the piston has traveled at least half of its stroke; the employment of the cylinder and piston which operates to reduce the pressure assures the maximum resistance at the beginning of the stroke, this resistance lessening as fluid is admitted through the control valve. By a suitable adjustment of the control valves 9 the resistance may be made substantially uniform throughout the whole length of the stroke if desired.

From the above description it will be seen that the first half of the closing movement of the door is controlled primarily by the reduced pressure in the cylinder 2, the action of the cylinder 2 being progressively augmented by the increasing pressure in the cylinder 3 while the last half of the closing movement is primarily under the control of the compressed air in the cylinder 3 which control is progressively reduced so far as the cylinder 2 is concerned. Of course, where a liquid is employed instead of air a single cylinder may be used as the difficulties in connection with a compressible medium such as air will not be present in the use of liquid.

Having fully described my invention, what I claim as new and desire to secure by Letters Patent, is:

1. In a door check and closer, the combination with a spring-actuated member, of a friction device connected therewith, and pneumatic means for controlling the application and release of said friction device.

2. In a door check and closer, the combination with a spring-actuated member, of a friction device connected therewith, a lever for operating said friction device, and pneumatic means connected with said lever for controlling the automatic application and release of said friction device.

3. In a door check and closer, the combination with a spring-actuated member, of a friction device connected therewith, operating means for said friction device, and pneumatic means connected with said operating means for retarding the movement of the latter to effect the application of the friction device during the initial closing movement of the mechanism.

4. In a door check and closer, the combination with a spring-actuated member, of a friction device connected therewith, operating means for said friction device, alining cylinders, pistons in said cylinders, valves for controlling the movements of said pistons, and means connecting both of said pistons with said operating means.

5. In a door check and closer, the combination with a spring-actuated member, of a friction device connected therewith, a cranked lever for expanding said friction device, alining cylinders, pistons in said cylinders, valves for controlling the movements of said pistons, and rods connecting said pistons with said cranked lever.

6. In a door check and closer, the combination with a casing, and a spring-actuated member, of a split brake ring located within said casing and connected with said spring-actuated member, a lever mounted in the space between the ends of said ring and having a crank disposed between the adjacent portions of said ring, alining cylinders on the casing, pistons in said cylinders, valves for controlling the movements of said pistons and connections between said pistons and said lever.

7. In a door check and closer, the combination with a casing and a spring-actuated member, of a split friction ring mounted in said casing and connected with said spring-actuated member, a lever disposed across said friction ring and provided with a cranked portion mounted between the adjacent ends of the split portion of the ring, and pneumatic means for controlling the operation of said lever to effect the application and release of the friction ring.

8. In a door check and closer, the combination with a casing, and a spring-actuated member, of a split friction ring coöperable with the wall of said casing and connected with said spring-actuated member, operating means for expanding said ring, and pneumatic means connected with said operating means for controlling the expansion and contraction of said friction ring.

9. In a door check and closer, the combination with a casing and a spring-actuated member, of a split friction ring coöperable with the wall of the casing and connected with said spring-actuated member, blocks secured to the adjacent ends of the split portion of the friction ring, a short shaft mounted between said blocks, a roller carried by said shaft to engage said blocks, a lever secured to said shaft, and pneumatic means connected with said lever for controlling the expansion and contraction of the friction ring.

10. In a door check and closer, the combination with a split casing, a spring-actuated member, and a friction brake member coöperable with the wall of the casing, of means for tightening the casing on said friction brake member, and means for controlling the operation of said brake member.

11. In a door check, the combination of a casing, an arm adapted to be oscillated by the movement of a door, a brake adapted to resist the oscillation of said arm, and fluid-controlled means adapted to be actuated by the movement of said arm for regulating the application of said brake, substantially as described.

12. In a door check, the combination of a casing, a shaft therein, an arm connected to the shaft and adapted to be oscillated by the movement of a door, a brake operatively associated with said shaft and adapted to resist the rotation of the shaft, a fluid cylinder and a piston, and means connecting said piston to the brake whereby the extent of application of said brake is controlled, substantially as described.

13. In a door check and closer, the combination of a member adapted to be rotated by the movement of a door, a spring tending to rotate said member in one direction, a brake for resisting the movement of said member, a fluid cylinder and piston, and means connecting said piston to said brake whereby the extent of application of said brake is controlled by the passage of fluid to and from the space in said cylinder in front of said piston, substantially as described.

14. In a door check, the combination with a spring-actuated member, of a friction device connected therewith, and fluid means for controlling the application and release of said friction device.

15. In a door check, the combination with a spring-actuated member, of a friction device connected therewith, a lever for operating said friction device, and fluid means connected with said lever for controlling the automatic application and release of said friction device.

16. In a door check, the combination with a spring-actuated member, of a friction device connected therewith, operating means for said friction device, and fluid means connected with said operating means for retarding the movement of the latter to effect the application of the friction device during the intitial closing movement of the mechanism.

17. In a door check, the combination with a spring-actuated member, of a friction device connected therewith, operating means for said friction device, cylinders, pistons in said cylinders, valves for controlling the movements of said pistons, and means connecting both of said pistons with said operating means.

18. In a door check, the combination with a spring-actuated member, of a friction device connected therewith, a cranked lever for expanding said friction device, cylinders, pistons in said cylinders, valves for controlling the movements of said pistons, and rods connecting said pistons with said cranked lever.

19. In a door check, the combination with a casing, and a spring actuated member, of a split brake ring located within said casing and connected with said spring-actuated member, a lever mounted in the space between the ends of said ring and having a crank disposed between the adjacent portions of said ring, cylinders on the casing, pistons in said cylinders, valves for controlling the movements of said pistons and connections between said pistons and said lever.

20. In a door check, the combination with a casing, and a spring actuated member, of a split friction ring mounted in said casing and connected with said spring-actuated member, a lever disposed across said friction ring and provided with a cranked portion mounted between the adjacent ends of the split portion of the ring, and fluid means for controlling the operation of said lever to effect the application and release of the friction ring.

21. In a door check, the combination with a casing, and a spring-actuated member, of a split friction ring coöperable with the wall of said casing and connected with said spring-actuated member, operating means for expanding said ring, and fluid means connected with said operating means for controlling the expansion and contraction of said friction ring.

22. In a door check, the combination with a casing, and a spring-actuated member, of a split friction ring coöperable with the wall of the casing and connected with said spring-actuated member, blocks secured to the adjacent ends of the split portion of the friction ring, a short shaft mounted between said blocks, a roller carried by said shaft to engage said blocks, a lever secured to said shaft, and fluid means connected with said lever for controlling the expansion and contraction of the friction ring.

23. In a door check, the combination with a split casing, a spring-actuated member, and a friction brake member coöperable with the wall of the casing, of means for tightening the casing on said friction brake member, and means for controlling the operation of said brake member.

Signed at Chicago, this 14th day of April, 1919.

JOHN C. SCHMIDT.

Witness:
T. D. BUTLER.

Copies of this patent may be obtained for five cents each, by addressing the "Commissioner of Patents, Washington, D. C."